Oct. 5, 1926.
D. F. HINTON
1,602,109
TIRE PUMP COUPLING
Filed Nov. 16, 1922
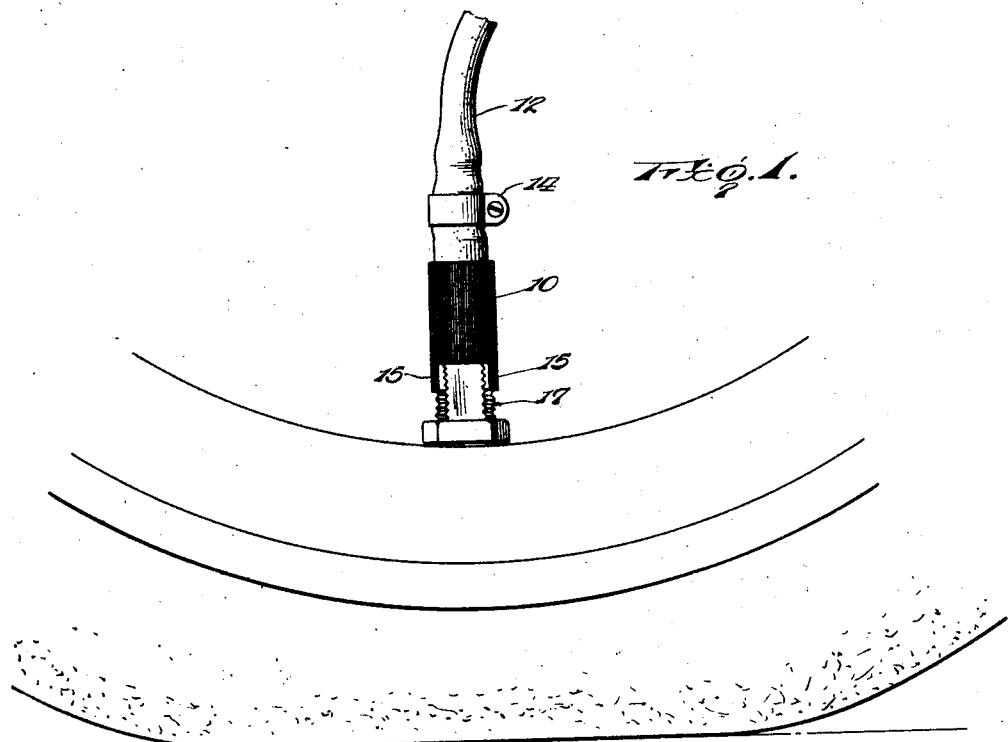
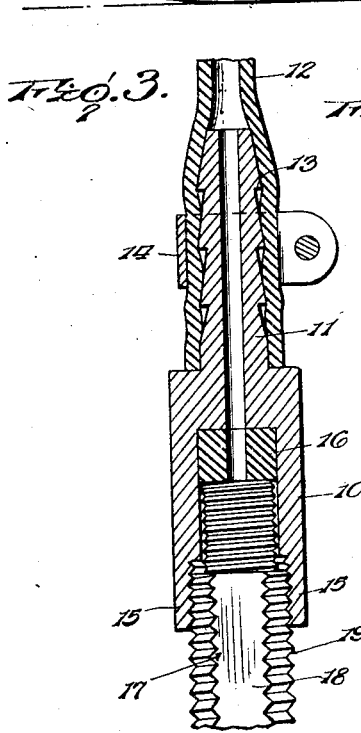
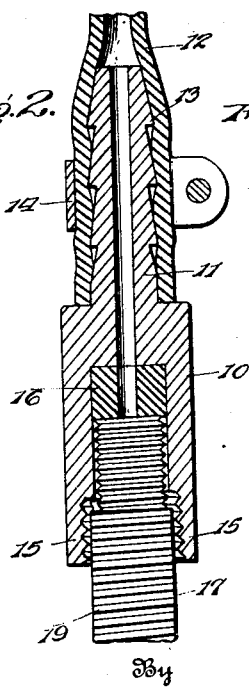
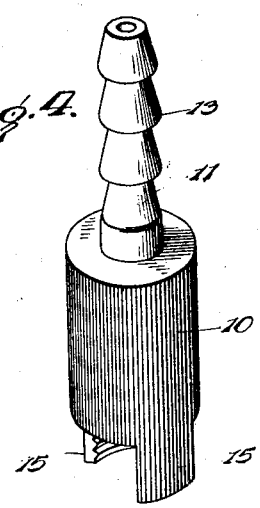
Inventor
D. F. Hinton.
By
Lacey & Lacey, Attorneys Patented Oct. 5, 1926.

1,602,109

UNITED STATES PATENT OFFICE.

DOCKTOR F. HINTON, OF EQUALITY, ALABAMA.

TIRE-PUMP COUPLING.

Application filed November 16, 1922. Serial No. 601,373.

This invention relates to an improved tire pump coupling and seeks, as one of its principal objects, to provide a device of this character whereby the hose of a tire pump may be easily and quickly attached to or detached from a tire valve.

The invention has as a further object to provide a device which will securely engage the valve stem and, unlike the well known rubber couplings as now in common use, cannot be forced off of the stem by air pressure during inflation of the tire.

And the invention has as a still further object to provide a device which will cooperate with the valve stem to provide an air-tight joint between the coupling and the stem.

Other and incidental objects will appear hereinafter.

In the drawings:

Figure 1 is a perspective view showing my improved pump coupling in use,

Figure 2 is a vertical sectional view showing the manner in which the device is applied, Figure 3 is a view similar to Figure 2, showing the device applied, and Figure 4 is a detail perspective view of the device.

In carrying the invention into effect, I employ a cylindrical metal shell 10 and rising from the shell at one end thereof is a reduced axially disposed nipple 11 of a diameter to fit into an ordinary tire pump hose conventionally illustrated at 12. The nipple is preferably shouldered as indicated at 13 for preventing displacement of the nipple and surrounding the adjacent end of the hose is an appropriate clamp 14 securely connecting the coupling with the hose. Integrally formed on the wall of the shell at its outer end in conformity with the cylindrical contour of the shell are depending diametrically disposed lugs 15 threaded at their inner sides and frictionally seated within the shell at its inner end is a gasket 16. The gasket may be of rubber or any other approved material.

In order to clearly bring out the advantages of my improved coupling, I have, for convenience, shown the device in connection with the stem 17 of a conventional tire valve. As is customary, this stem is provided with longitudinally extending oppositely disposed flat faces 18 as well as longitudinally extending oppositely disposed threaded faces 19. As will be observed, the shell 10 is formed to snugly but freely fit over the nipple at the upper end of the stem. Accordingly, in applying the device, the lugs 15 of the shell may be brought opposite the flat faces 18 of the stem when the shell may be telescoped over the stem to engage the gasket 16 with the upper end of the stem. Pressure against the device will then, of course, serve to compress the gasket, when the device is rotated a quarter turn to engage the threads of the lugs 15 with the threaded faces 19 of the stem. The device will thus be rigidly secured upon the stem while the gasket 15 will be held compressed to form an air-tight joint between the coupling and the stem. Accordingly, leakage of air during the operation of inflating the tire will be prevented while the coupling cannot be forced from the stem by air pressure within the coupling. As will be perceived, the device may be easily and quickly attached to the stem and by counter-rotating the coupling a quarter turn to free the coupling, the device may be detached from the stem with equal facility.

Having thus described the invention, what is claimed as new is:

A coupling for connecting an air pipe to the accustomed tire valve having an outer reduced threaded end and opposite flat sides, with the portions between the flat sides provided with thread sections, the same consisting of a head having a smooth-walled axial opening in one end to receive the reduced threaded end of the tire valve, and having an integral longitudinal stem at its opposite end to receive the air pipe, the stem having an opening therein in communication with the opening of the head, said head having opposed longitudinal lugs at its outer end, with their inner faces set outwardly from the walls of the axial opening to accommodate the enlarged portion of the tire valve, said lugs having thread sections upon their inner faces to engage the thread sections at opposite sides of the tire valve, and said lugs with the spaces therebetween forming guide means for properly positioning the coupling when applying the same to the tire valve.

In testimony whereof I affix my signature.

DOCKTOR F. HINTON. [L. S.]